US008816563B2

(12) United States Patent
Roos

(10) Patent No.: US 8,816,563 B2
(45) Date of Patent: Aug. 26, 2014

(54) SIX-POLE DC MACHINE

(75) Inventor: Gerald Roos, Sasbachried (DE)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 13/063,237

(22) PCT Filed: Jul. 17, 2009

(86) PCT No.: PCT/EP2009/059197

§ 371 (c)(1),
(2), (4) Date: Mar. 10, 2011

(87) PCT Pub. No.: WO2010/031610

PCT Pub. Date: Mar. 25, 2010

(65) Prior Publication Data

US 2011/0169370 A1 Jul. 14, 2011

(30) Foreign Application Priority Data

Sep. 17, 2008 (DE) .......................... 10 2008 042 156

(51) Int. Cl.
*H01R 39/04* (2006.01)
*H01R 39/06* (2006.01)
*H02K 13/10* (2006.01)

(52) U.S. Cl.
CPC ..................................... *H02K 13/10* (2013.01)
USPC ............ 310/248; 310/237; 310/236; 310/241

(58) Field of Classification Search
CPC ......... H02K 13/10; H01R 39/04; H01R 39/06
USPC ........................... 310/207, 233, 236, 238, 248
See application file for complete search history.

(56) References Cited

U.S. PATENT DOCUMENTS 2,645,731 A    7/1953   Volff et al.
3,648,090 A *  3/1972   Voin ............................... 310/191
3,668,450 A *  6/1972   Rozelle et al. ................. 310/237
(Continued)

FOREIGN PATENT DOCUMENTS

| JP | 58-143481 | 8/1983 | |
|----|-----------|--------|----|
| JP | 37-10908 | 10/2005 | |
| WO | 01/10003 | 2/2001 | |
| WO | WO2008062791 | * 5/2008 | ............. H02K 23/04 |

OTHER PUBLICATIONS

Machine translation of WO2008062791, Shiuoda et al., May 2008.*
PCT/EP20091059197 International Search Report.

*Primary Examiner* — Terrance Kenerly

(74) *Attorney, Agent, or Firm* — Michael Best & Friedrich LLP

(57) ABSTRACT

The invention relates to a six-pole DC machine, particularly a DC motor for use in a motor vehicle, having a stator (16) excited preferably by a permanent magnet and a rotor (20) which is rotatably supported in a pole housing (12) and which has a wave winding (23) and a commutator (24), and having a brush carrier (28) for holding the brushes (26) and preferably additional components (30, 31; 32). In contrast to a full equipping, the brush arrangement has less than six brushes (26), which are arranged on the circumference of the commutator (24) at an angular distance of approximately 60° to each other. Thus, the ripple of the rotor current, the torque oscillations, and the noise emission are clearly reduced and free space is created on the brush carrier for accommodating suppressor components (30, 31; 32).

10 Claims, 5 Drawing Sheets

(56) References Cited

U.S. PATENT DOCUMENTS

| | | | |
|---|---|---|---|
| 4,760,318 A * | 7/1988 | Jones | 318/362 |
| 4,965,478 A | 10/1990 | Kobayashi et al. | |
| 5,072,129 A | 12/1991 | Sugiyama | |
| 6,891,304 B1 | 5/2005 | Cros et al. | |
| 2006/0055271 A1 * | 3/2006 | Kaneko | 310/208 |
| 2007/0018530 A1 * | 1/2007 | Yamamoto et al. | 310/239 |
| 2007/0080601 A1 | 4/2007 | Kuenzel et al. | |
| 2007/0188040 A1 * | 8/2007 | Kawashima et al. | 310/225 |
| 2008/0093943 A1 * | 4/2008 | Roos | 310/154.45 |
| 2009/0236928 A1 | 9/2009 | Hawighorst | |
| 2010/0052440 A1 | 3/2010 | Shioda et al. | |

* cited by examiner

SIX-POLE DC MACHINE

BACKGROUND OF THE INVENTION

The invention is based on a six-pole direct-current machine, in particular a six-pole direct-current motor for use in a motor vehicle, having a stator which preferably has permanent magnet excitation and having a rotor which is mounted in a pole housing such that it can rotate and having a wave winding. Machines such as these are fundamentally known, for example for use as starter motors for motor vehicles.

Furthermore, patent application EP 0359603 A discloses a six-pole direct-current machine having a rotor winding which is fed via four brushes, and whose brushes of the same polarity are arranged at an angle of preferably 120°, while the brushes at different potentials include an angle of preferably 60°. In this case, two brushes are in each case diametrically opposite on the commutator, thus resulting in only two commutation times for the rotor winding, despite an arrangement of four brushes.

SUMMARY OF THE INVENTION

The six-pole direct-current machine according to the invention has the advantage that, with the physical size of the machine fundamentally having already been reduced, the six-pole embodiment with the size of the brush apparatus being reduced at the same time makes it possible to reduce the costs of the machine, in which case the special arrangement of the brushes considerably reduces the ripple in the motor current and the torque ripple, as well as the noise stimuli produced in this way and electromagnetic interference, while at the same time increasing the life of the machine.

It is particularly advantageous for the commutator of the machine to have an even number of laminates, with the number corresponding in particular to twice the number of rotor slots.

The reduction in the number of brushes to an arrangement with only two brushes in this case results in a very great advantage in terms of manufacturing costs and saving of physical space. An arrangement according to the invention of three or four brushes and the increase achieved in this way in the commutation times of the rotor current to three makes it possible to reduce even further the ripple in the motor current with relatively little additional complexity, while considerably reducing the costs and reducing the space requirement as well in comparison to the brush arrangement being fitted completely, and with approximately the least possible ripple in the motor current when fitted with six brushes. The reduction in the number of brushes and their cross section in each case has to take account of the current load on the brushes.

From the design point of view, it is advantageous for the brush holder to have four holders for holding brush boxes in a sector of about 180°, which brush boxes can optionally be fitted with 2, 3 or 4 brushes, depending on the application. This allows the brush fit to be matched to the current load for the respective size, with a single embodiment of the brush holder, thus reducing the range of parts for production of the machines.

All the brushes are preferably in this case arranged in a first sector of the brush holder, and electrical suppression means that are required are arranged outside this sector, with the electrical connections which have already been suppressed running outside that sector of the brush holder which is occupied by the brushes, and thus preventing interference from being introduced again into the lines which have already been suppressed.

With regard to the configuration of the rotor, it is advantageous for the rotor to have ten individual teeth 21 and for the rotor winding to be in the form of a single-tooth winding. This results in good utilization of the rotor iron, and in improvement in the efficiency of the machine.

BRIEF DESCRIPTION OF THE DRAWINGS

Exemplary embodiments of the invention will be explained in more detail in the following description, and are illustrated in the drawings, in which.

DETAILED DESCRIPTION

Figure 1:
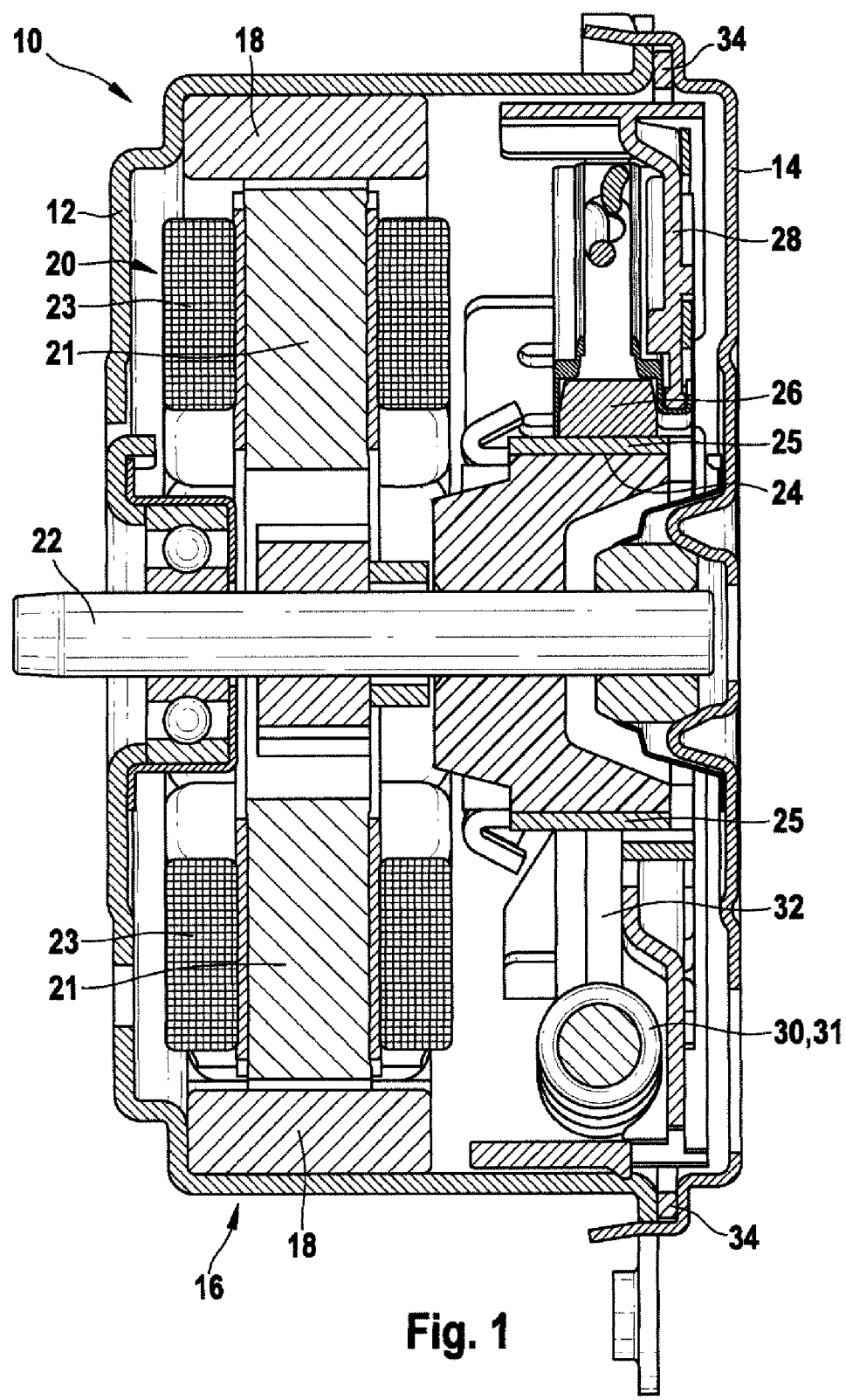
FIG. 1 shows a sectional illustration of the direct-current machine according to the invention.

In FIG. 1, 10 denotes a six-pole direct-current machine in the form of a drive motor for a cooling fan in a motor vehicle. The machine has a pole housing 12 which is in the form of a pot and is closed at one end by a bearing cover 14. A stator 16 is formed within the pole housing 12 by means of six permanent magnets 18, which are attached to the pole housing 12 in a known manner. A rotor 20 in the machine with individual teeth 21 is seated on a shaft 22 which is borne, such that it can rotate, at one end in the pole housing 12 and at the other end in the bearing cover 14.

A commutator 24 with laminates 25 and slots 27 is also arranged on the rotor shaft 22 and is supplied with the exciter current for the individual tooth-wound coils in a wave winding 23, via brushes 26.

The brushes 26 and further components, in particular the suppression means required for the machine, are held on a brush holder 28. One or two suppression inductors 30, 31 and a capacitor 32 can be seen of the suppression means for the motor in FIG. 1. The brush holder 28 is locked in the pole housing 12 by means of an attachment flange 34, which extends over the entire circumference of the brush holder and is clamped between the pole housing 12 and the bearing cover 14 when the machine is in the completely assembled state. The design of the brush holder 28 and the arrangement of the brushes will be explained in detail with reference to the following figures, in which the same reference symbols are used for the same parts.

Figure 2:
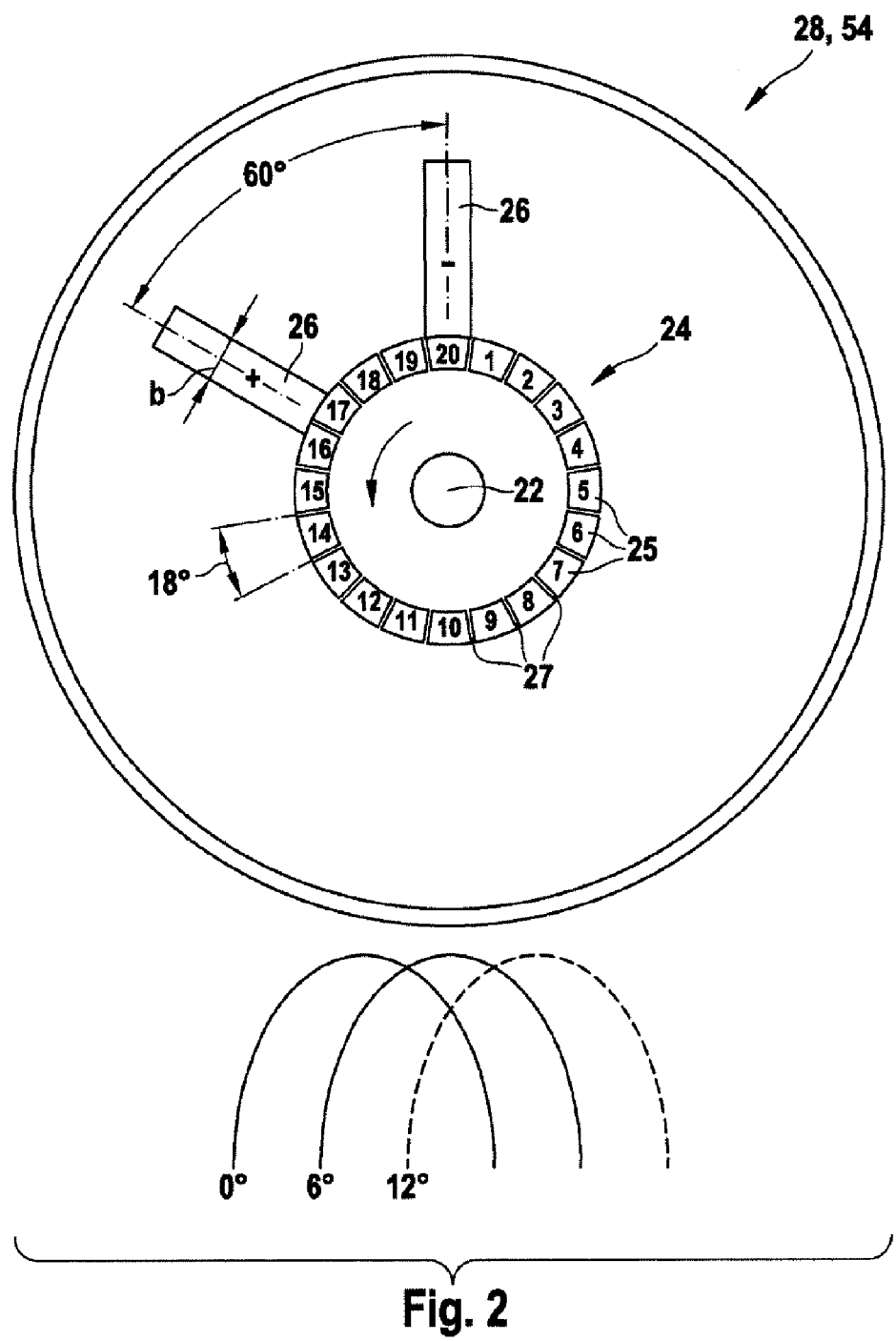
FIG. 2 shows a schematic illustration of a rotor, through which current is passed via two brushes, with the associated current characteristics.
Figure 3:
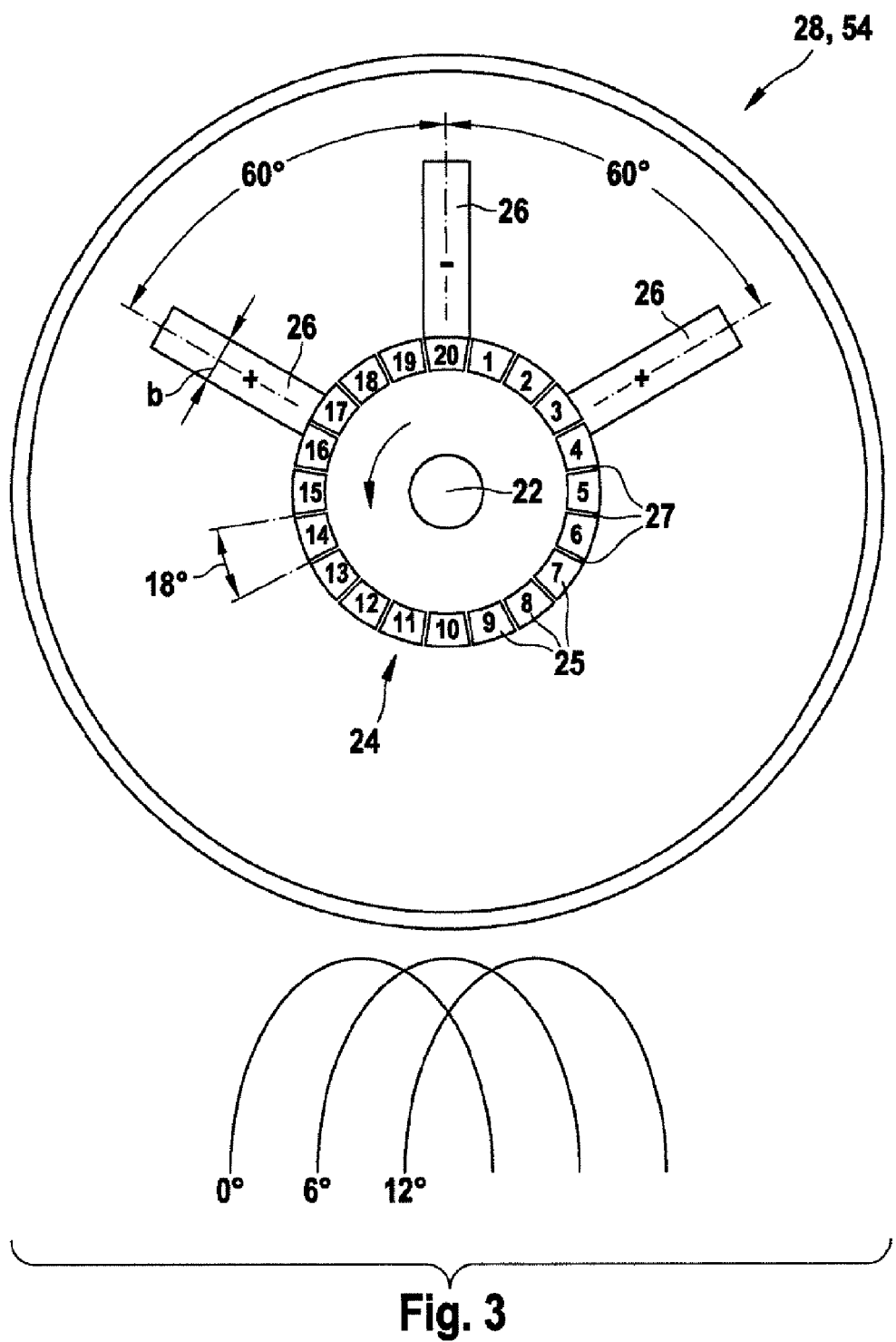
FIG. 3 shows a schematic illustration of a rotor, through which current is passed via three brushes, with the associated current characteristics.
Figure 4:
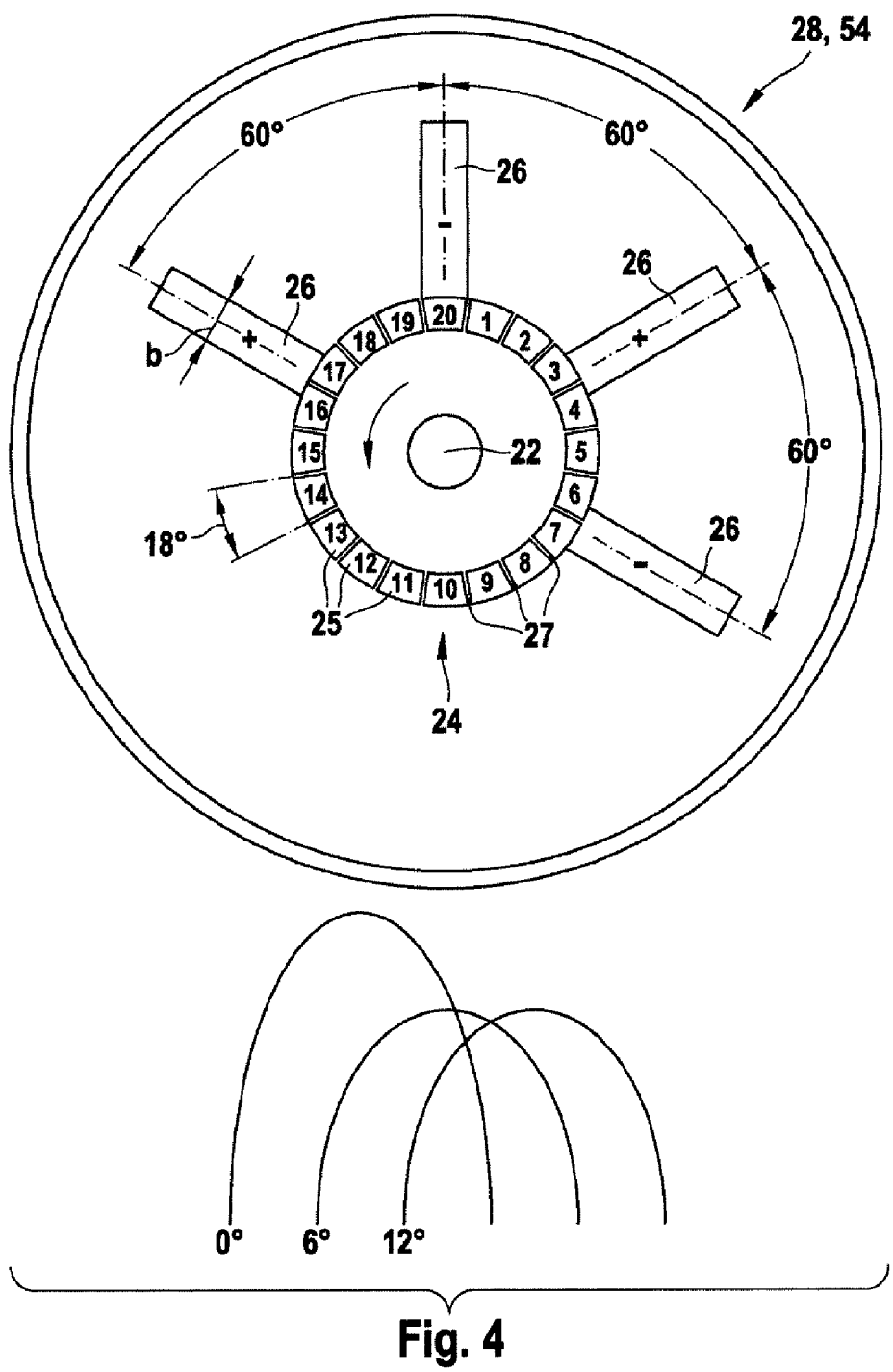
FIG. 4 shows a schematic illustration of a rotor, through which current is passed via four brushes, with the associated current characteristics.

FIGS. 2 to 4 show schematic illustrations of the brush holder 28 for the direct-current machine according to the invention, with the brushes 26 and the commutator 24. In all three embodiments, the brushes 26 are arranged with an angular separation of about 60° between each of them, with a tolerance of ±5°. The current is supplied to the commutator 24 via two brushes in FIG. 2, via three brushes in FIG. 3, and via four brushes in FIG. 4. The brushes 26 each have a width b which is slightly narrower than the surface width of the commutator laminates 1 to 20. All three embodiments have the same number, of in each case 20, commutator laminates 25 for ten rotor teeth 21. According to the invention, the number of brushes is in each case less than that for a six-pole direct-current machine with a wave winding when completely fitted with a total of six brushes, although the current ripple and the torque ripple caused by it, as well as the resultant noise that is produced, are considerably less than when six-pole machines are fitted in a known manner with two or four brushes, which are diametrically opposite one another on the commutator.

The current profile in the rotor coils is likewise shown schematically in the illustrations, on the right alongside the brush arrangements in FIGS. 2, 3 and 4. As can be seen from the curve profile, in the arrangement as shown in FIG. 2 with two brushes arranged at an angle of 60° with respect to one another, only two commutation processes take place in the region of a laminate subdivision of 18°, while, when three or four brushes are used as shown in FIGS. 3 and 4, three commutation operations take place in this area, to be precise each with an interval of 6° on the commutator circumference. The missing half-cycle of the current is indicated by a dashed line in the arrangement shown in FIG. 2. In contrast to two diametrically opposite brushes with the same position with respect to the commutator slots 27, there are, however, in this case two commutation processes instead of a single commutation process in the area of a laminate subdivision, as a result of which the resultant current ripple is considerably less than for the known diametrically opposite arrangement of two brushes, with one commutation time per laminate subdivision.

In the arrangements according to the invention corresponding to FIGS. 3 and 4, three and four brushes, 26, respectively, are each arranged with an angular separation of about 60° between them, assuming three different positions with respect to the commutator slots on the circumference of the commutator 24, as a result of which three commutation times occur in the area of one laminate subdivision, with the current ripple being reduced even more in comparison to the embodiment shown in FIG. 2. In addition, in the case of the arrangement with four brushes as shown in FIG. 4, the current load in the brushes 26 is in each case halved in the region of a commutation process, thus increasing the brush life.

Furthermore, the illustrations in FIGS. 2 to 4 clearly show the reduction in the space required for the brushes 26, thus creating space for the arrangement of suppression components 30, 31, 32 of the brush holder 26.

Figure 5:
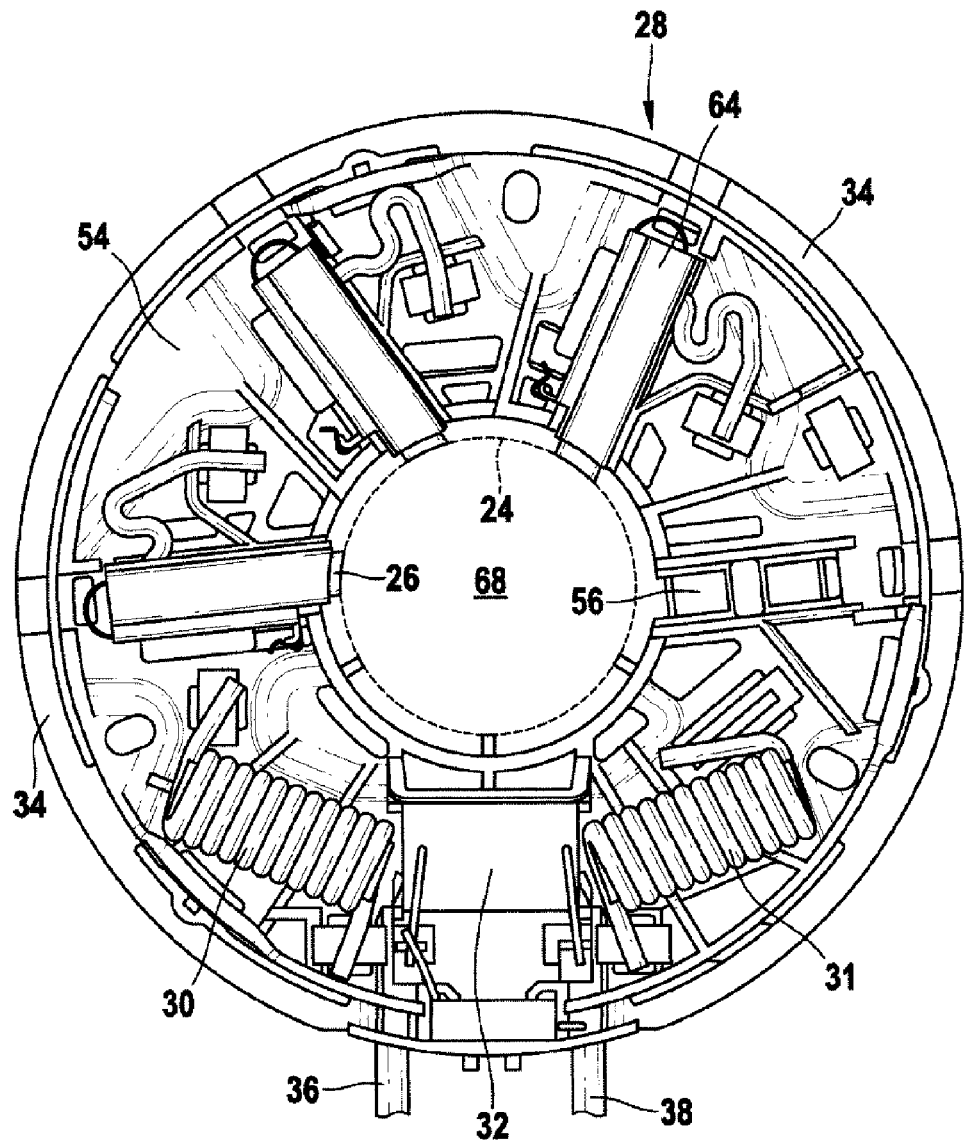
FIG. 5 shows a view of a brush holder, which is fitted with three brushes and suppression components, for the machine according to the invention.

FIG. 5 shows a plan view of the brush holder 28, which has been injection-molded from plastic. The current supply from a DC voltage source, which is not illustrated, is provided via two connecting lines 36 and 38, one of which is connected to the positive pole and the other to the negative pole of the DC voltage source, as well as to the suppression inductors 30 and 31. At the same time, the connecting line 36 is connected to one electrode of the suppression capacitor 32, and the connecting line 38 is connected to its other electrode. The illustration in FIG. 5 shows the arrangement of the suppression components 30, 31 and 32 on the brush holder 28. The placement grippers 56 for brush boxes 64 are arranged on the base plate 54 such that the brushes 26 are located in a first sector, which extends approximately over the upper half of the base plate 54, and the electrical suppression means 30, 31, 32 are located in a second sector on the lower half of the base plate 54. This arrangement means that the suppressed electrical connections for the inductors 30 and 31 and for the capacitor 32 run outside the upper sector of the brush holder 28, which is occupied by the brushes 26, and the longitudinal axes of the brushes do not intersect the electrical connections, which are located between the electrical connecting lines 36, 38 and the suppression inductors 30, 31. Interruptor signals are therefore no longer induced in the already suppressed electrical connections from the brushes, thus considerably improving the electromagnetic compatibility (EMC) of the machine and saving physical space in the machine. The position of the commutator 24 is indicated by a dashed line.

What is claimed is:

1. A six-pole direct-current machine comprising: a stator (16), a rotor (20) which is mounted in a pole housing (12) such that the rotor can rotate and has a wave winding (23) and a commutator (24) and ten individual teeth, and a brush holder (28) for holding brushes (26) of a brush arrangement, wherein the brush arrangement has less than six brushes (26), adjacent brushes being arranged with an angular separation of about 60° on a circumference of the commutator (24), wherein the commutator (24) has twenty laminates (25), and further wherein the brush arrangement has four brushes (26) disposed on the circumference of the commutator (24) such that each of the four brushes is relatively positioned in relation to a respective immediately adjacent commutator slot, wherein the relative position is different for three of the four brushes, and further wherein the current load in the brushes (26) is in each case halved in the region of a commutation process.

2. The direct-current machine as claimed in claim 1, wherein the brush holder (28) is circular and has four holders (56) for holding brush boxes (64) in a sector of about 180°.

3. The direct-current machine as claimed in claim 1, wherein two to four brushes (26) are arranged in one sector of the brush holder (28), and electrical suppression means (30, 31; 32) are arranged outside this sector.

4. The direct-current machine as claimed in claim 1, wherein suppressed electrical connections for the brushes (26) are located outside a sector of the brush holder (28) which is occupied by the brushes.

5. The direct-current machine as claimed in claim 1, wherein at least two suppression inductors (30, 31) and at least one suppression capacitor (32), as well as associated connecting lines (36, 38), are arranged outside a sector of the brush holder (28) which is occupied by the brushes (26).

6. The direct-current machine as claimed in claim 1, wherein the wave winding (23) on the rotor (20) is a single-tooth winding.

7. The direct-current machine as claimed in claim 1, wherein the brush arrangement has four brushes (26), which assume three different positions with respect to commutator slots (27) on the circumference of the commutator (24).

8. The direct-current machine as claimed in claim 1, wherein the direct-current machine is a direct-current motor for use in a motor vehicle.

9. The direct-current machine as claimed in claim 1, wherein the stator has permanent magnet excitation.

10. The direct-current machine as claimed in claim 1, wherein the three brushes produce three commutation operations, each with an interval of 6 degrees on the circumference of the commutator.

* * * * *